United States Patent
Tanaka et al.

(10) Patent No.: US 7,487,468 B2
(45) Date of Patent: Feb. 3, 2009

(54) VIDEO COMBINING APPARATUS AND METHOD

(75) Inventors: Rika Tanaka, Kanagawa (JP);
Toshikazu Ohshima, Kanagawa (JP);
Kaname Tomite, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 760 days.

(21) Appl. No.: 10/671,611

(22) Filed: Sep. 29, 2003

(65) Prior Publication Data

US 2004/0070611 A1  Apr. 15, 2004

(30) Foreign Application Priority Data

Sep. 30, 2002 (JP) ............................ 2002-287054
Jul. 31, 2003 (JP) ............................ 2003-204813

(51) Int. Cl.
*G06F 3/033* (2006.01)

(52) U.S. Cl. ..................... 715/863; 715/744; 715/756; 715/757; 715/773; 345/7; 345/156; 382/103

(58) Field of Classification Search ................ 715/863, 715/744, 756–757, 773; 345/7–9, 156–157; 382/103

See application file for complete search history.

(56) References Cited

U.S. PATENT DOCUMENTS

| | | | | |
|---|---|---|---|---|
| 4,270,848 A | * | 6/1981 | Angenieux | 359/687 |
| 5,319,747 A | * | 6/1994 | Gerrissen et al. | 715/839 |
| 5,765,561 A | * | 6/1998 | Chen et al. | 600/407 |
| 5,790,104 A | * | 8/1998 | Shieh | 345/173 |
| 6,002,808 A |  | 12/1999 | Freeman | 382/288 |
| 6,084,557 A |  | 7/2000 | Ishida et al. | 345/9 |
| 6,084,594 A | * | 7/2000 | Goto | 345/427 |
| 6,181,302 B1 | * | 1/2001 | Lynde | 345/7 |
| 6,184,932 B1 |  | 2/2001 | Tanaka | 348/347 |
| 6,317,128 B1 |  | 11/2001 | Harrison et al. | |
| 6,346,929 B1 | * | 2/2002 | Fukushima et al. | 345/8 |
| RE37,668 E | * | 4/2002 | Etoh | 382/251 |

(Continued)

FOREIGN PATENT DOCUMENTS

EP   0 772 350   5/1997

(Continued)

OTHER PUBLICATIONS

G. Reltmayr, et al., "Mobile Calloborative Augmented Reality", Proc. IEEE Virtual Reality 2001, pp. 114-123 (2001).

(Continued)

*Primary Examiner*—Ba Huynh
*Assistant Examiner*—Nicholas Augustine
(74) *Attorney, Agent, or Firm*—Fitzpatrick, Cella, Harper & Scinto

(57) ABSTRACT

A video combining apparatus to superimpose a virtual image such a CG image on a video image of the real world or on a see-through type display device. An area in which the virtual image is not to be displayed can be easily designated by a user. If the user holds a frame with markers in his/her sight, the frame is image-sensed in the video image of the real world. The area designated by the user is detected by detecting the position of the marker in the video image, and the virtual image is not superimposed in this area.

10 Claims, 13 Drawing Sheets

U.S. PATENT DOCUMENTS

| | | | | |
|---|---|---|---|---|
| 6,559,813 | B1* | 5/2003 | DeLuca et al. | 345/8 |
| 6,559,870 | B1 | 5/2003 | Anabuki et al. | 345/849 |
| 6,690,960 | B2* | 2/2004 | Chen et al. | 600/407 |
| 6,741,223 | B2* | 5/2004 | Kobayashi et al. | 345/7 |
| 6,771,294 | B1* | 8/2004 | Pulli et al. | 715/863 |
| 6,803,928 | B2* | 10/2004 | Bimber et al. | 715/757 |
| 6,850,252 | B1* | 2/2005 | Hoffberg | 715/716 |
| 7,046,263 | B1* | 5/2006 | Abbott et al. | 715/740 |
| 7,055,101 | B2* | 5/2006 | Abbott et al. | 715/744 |
| 7,058,893 | B2* | 6/2006 | Abbott et al. | 715/744 |
| 7,058,894 | B2* | 6/2006 | Abbott et al. | 715/744 |
| 7,062,715 | B2* | 6/2006 | Abbott et al. | 715/744 |
| 7,073,129 | B1* | 7/2006 | Robarts et al. | 715/744 |
| 7,076,737 | B2* | 7/2006 | Abbott et al. | 715/744 |
| 7,080,322 | B2* | 7/2006 | Abbott et al. | 715/744 |
| 7,089,497 | B2* | 8/2006 | Abbott et al. | 715/740 |
| 7,107,539 | B2* | 9/2006 | Abbott et al. | 715/744 |
| 7,137,069 | B2* | 11/2006 | Abbott et al. | 715/744 |
| 7,155,456 | B2* | 12/2006 | Abbott et al. | 707/104.1 |
| 7,167,779 | B2* | 1/2007 | Kashiwada et al. | 701/1 |
| 7,203,906 | B2* | 4/2007 | Abbott et al. | 715/747 |
| 7,225,229 | B1* | 5/2007 | Abbott et al. | 709/206 |
| 2001/0000435 | A1 | 4/2001 | Tanaka | 348/358 |
| 2001/0005218 | A1 | 6/2001 | Gloudemans et al. | |
| 2002/0044152 | A1* | 4/2002 | Abbott et al. | 345/629 |
| 2002/0186228 | A1* | 12/2002 | Kobayashi et al. | 345/633 |
| 2003/0012409 | A1* | 1/2003 | Overton et al. | 382/103 |
| 2003/0029464 | A1* | 2/2003 | Chen et al. | 128/922 |
| 2003/0032876 | A1* | 2/2003 | Chen et al. | 600/407 |
| 2003/0081235 | A1 | 5/2003 | Tanaka et al. | 358/1.13 |
| 2003/0081237 | A1 | 5/2003 | Ogiwara et al. | 358/1.14 |
| 2003/0081251 | A1 | 5/2003 | Tanaka et al. | 358/1.15 |
| 2003/0154476 | A1* | 8/2003 | Abbott et al. | 725/37 |
| 2004/0068758 | A1* | 4/2004 | Daily et al. | 725/136 |
| 2004/0070611 | A1* | 4/2004 | Tanaka et al. | 345/757 |
| 2004/0139156 | A1* | 7/2004 | Matthews et al. | 709/204 |
| 2005/0027186 | A1* | 2/2005 | Chen et al. | 600/407 |
| 2006/0277474 | A1* | 12/2006 | Robarts et al. | 715/745 |

FOREIGN PATENT DOCUMENTS

| | | |
|---|---|---|
| JP | 10-051711 | 2/1998 |
| JP | 2000-95535 | 4/2000 |
| JP | 2000-101898 | 4/2000 |
| JP | 2000-276610 | 10/2000 |
| JP | 2002-269593 | 9/2002 |
| WO | 02/15110 | 2/2002 |

OTHER PUBLICATIONS

Alberto Valinetti, et al., "Model Tracking for Video-Based Virtual Reality", IEEE pp. 372-377 (Sep. 2001).

Kiyohide Satoh, et al., "A Hybrid Registration Method for Outdoor Augmented Reality", *Proceedings: IEEE and ACM International Symposium in New York,* pp. 67-76 (Oct. 2001).

Masayuki Kanbara, et al., "Real-Time Composition of Stereo Images for Mixed Reality",*ITE Technical Report,* vol. 22, No. 33, pp. 31-36 (Jun. 19, 1998).

\* cited by examiner

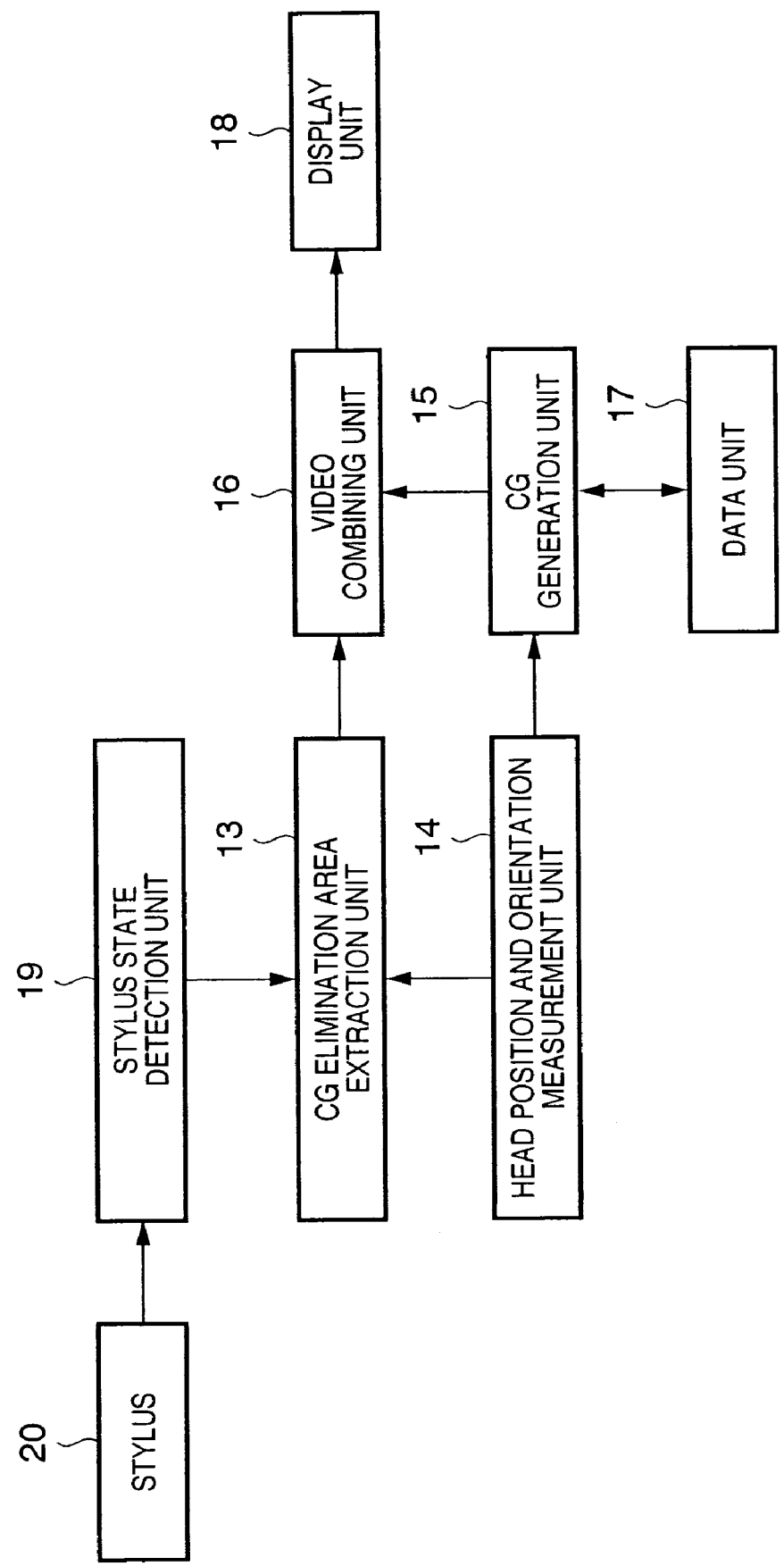

VIDEO COMBINING APPARATUS AND METHOD

FIELD OF THE INVENTION

The present invention relates to video combining apparatus and method for superimposition of video image and information generated by a computer (CG: Computer Graphics) on a video image of the real world, and more particularly, to CG image display control on an area of real space to which a user is to pay attention.

BACKGROUND OF THE INVENTION

As techniques to support various actions by using a video image where a CG image is superimposed on a video image of the real world are actively studied as Augmented Reality (AR) or Mixed Reality (MR) techniques. For example, the purposes of medical support by visualization of the inside of a patient body, work assistance by overlay-displaying a product assembly procedure on real parts in a factory, further, guidance by displaying place names and landmark names on a real landscape, and the like are known.

In CG image superimposition, some real-space area is hidden by a CG image. There is no problem if the user has no interest in the covered area. However, conventionally, even a real-space area to which the user pays attention could be hidden by the CG image since CG image superimposition is made just according to predetermined settings, without considering whether the area to be hidden is of interest or not.

G. Reitmayr and D. Schmalstieg show in "Mobile Collaborative Augmented Reality" In Proc. IEEE Virtual Reality 2001, pages 114-123, study of appropriate CG image display position particularly in a mobile AR system from analysis or CG image display position (Head-stabilized: information is displayed in a fixed position in correspondence with a user's view point; Body-stabilized: information is displayed in a fixed position in correspondence with the position of the user's body; and World-stabilized: a display position of information is controlled in correspondence with a position in the real world). Further, Japanese Published Unexamined Patent Application No. 2000-276610 (JP-A-2000-276610) relating to agent display or the like, discloses a system to display a user-friendly agent character. However, in both systems, some heuristics are employed as to CG image display position, and there is no consideration about the case where a target real space area is hidden by a CG image.

Further, a technique to display a particular real object (e.g., a user's hand) as an always-visible object (mask processing technique) is realized by using a chroma key technique or the like. However, the real world changes every second, and the user does not always pay attention to the same real object.

From this situation, generally, in a case where a real-space area to be observed by the user is hidden by a CG image, (1) the user removes an HMD, or if possible, (2) the CG image and video image (images of real world) are selectively displayed, or further, if possible, (3) a virtual object (forming the obstructive CG image) is selected and moved to another position. In the case of (2), because the whole CG image is displayed/not displayed at once, a part of the CG image cannot be selectively displayed. Further, in the case of (3), the operation of "selecting and moving" the virtual object is troublesome.

SUMMARY OF THE INVENTION

The present invention has been made in consideration of the problems of the conventional techniques, and has a main object to realize a video combining apparatus for superimposition of a computer-generated image on the real world observed by a user, in which CG image display is not made in a particular real-space area to which the user pays attention with simple setting.

According to an aspect of the present invention, a video combining method for superimposing a virtual image generated by a computer on the real world observed by a user, comprising the steps of: inputting an image obtained by image sensing the real world; inputting position and orientation information of the user's view point; generating a virtual image based on the position and orientation information; extracting a virtual image elimination area of the virtual image; and combining the virtual image with the image obtained by image sensing based on the virtual image elimination area.

According to another aspect of the present invention, a video combining apparatus for superimposing a virtual image generated by a computer on the real world observed by a user, comprising: image input unit adapted to input an image obtained by image sensing the real world; position and orientation information input unit adapted to input position and orientation information of the user's view point; virtual image generation unit adapted to generate a virtual image based on the position and orientation information; elimination area extraction unit adapted to extract a virtual image elimination area of the virtual image; and combining unit adapted to combine the virtual image with the image obtained by image sensing based on the virtual image elimination area.

According to further aspect of the present invention, a video combining method for superimposing a virtual image on a video image of the real world observed by a user, comprising: an image input step of inputting a video image of the real world observed by the user; a position and orientation information input step of inputting position and orientation information of the user's view point; a virtual image generation step of generating a virtual image based on the position and orientation information; a designated area detection step of detecting a predetermined area designated by the user; and a superimposition step of superimposing the virtual image on the video image except a portion corresponding to the area in the video image detected at the designated area detection step.

According to another aspect of the present invention, a computer-readable medium holding program code to realize a video combining method for superimposing a virtual image generated by a computer on the real world observed by a user, by a computer, comprising: process procedure code for inputting an image of the real world obtained by image sensing; process procedure code for inputting position and orientation information of the user's view point; process procedure code for generating a virtual image based on the position and orientation information; process procedure code for extracting a virtual image elimination area; and process procedure code for combining the virtual image with the image obtained by image sensing based on the information on the virtual image elimination area.

According to another aspect of the present invention, a computer-readable medium holding program code to realize a video combining method for superimposing a virtual image on a video image of the real world observed by a user, by a computer, comprising: process procedure code for inputting a video image of the real world observed by the user obtained by image sensing; process procedure code for inputting position and orientation information of the user's view point; process procedure code for generating a virtual image based on the position and orientation information; process procedure code for detecting a predetermined area designated by the user; and process procedure code for superimposing the virtual image on the video image obtained by image sensing except a portion corresponding to the area in the video image detected at the detection process.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a block diagram showing an example of the construction of the video combining apparatus according to the second embodiment;

DETAILED DESCRIPTION OF THE PREFERRED EMBODIMENTS

Preferred embodiments of the present invention will now be described in detail in accordance with the accompanying drawings.

First Embodiment

An example of a video combining apparatus according to a first embodiment of the present invention is an MR system for auxiliary display of position information and names in correspondence with a landscape viewed by a user wearing a display device.

In the present embodiment, a video see-through HMD capable of position and orientation measurement is employed as the display device. That is, the HMD includes a position and orientation sensor and a camera, and a video image from the user's approximate view point position can be obtained based on position and orientation information (strictly, the position and orientation of the camera) of the user's head.

Further, in the present embodiment, to enable the user's designation of an area on which the user does not want CG image superimposition (a CG elimination area), a user interface (hereinbelow, referred to as a "CG elimination frame") with markers associated with the CG elimination area is employed. The CG elimination area is extracted from the video image from the user's view point position by extracting a marker provided in the CG elimination frame.

Figure 1B:
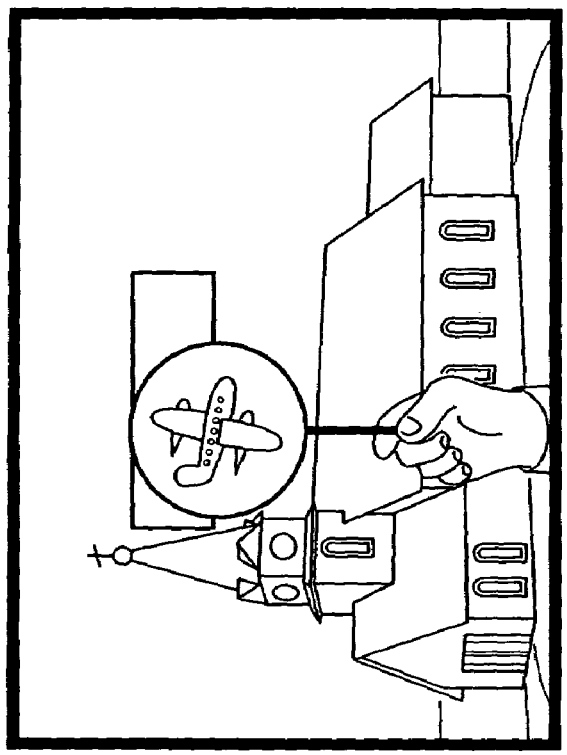
FIGS. 1A and 1B are explanatory views showing the conception of the present invention for designation of a CG elimination area using a frame.
Figure 1A:
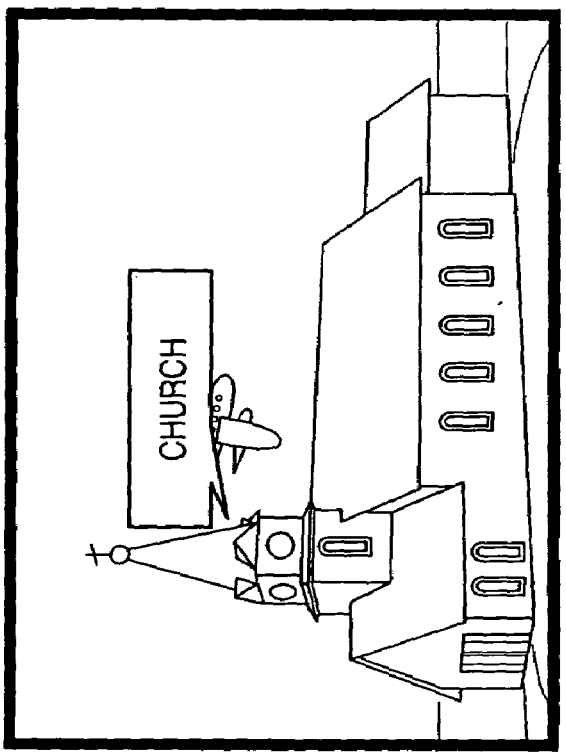

FIGS. 2A to 2D show examples of the CG elimination frame (association between the markers and the CG elimination area). Here, for the sake of simplicity, the CG elimination frame is used under the constraint that it is used in parallel to an image sensing plane of the camera (image sensing unit) provided in the HMD. Small circles indicate the markers, and a hatched portion indicates the CG elimination area. The hatched portion may or may not exist. If the hatched portion exists, the hatched portion should be made of transparent or semi-transparent material, or an input means to input an image of real world corresponding to the hatched portion is required. The CG elimination frame has a handgrip 21 which the user holds and a frame 22. When the user observes a superimposed image as shown in FIG. 1A, if the user wants to eliminate a superimposed image on a balloon "church", the user holds the frame in his/her sight, and moves the frame to a desired position (on an area where the CG image is not to be displayed) while observing the real-space image obtained by the camera.

As described later, because the area designated with the frame is obtained with the markers provided in the frame and in the MR system according to this embodiment, the CG image is not superimposed in the area, the image of the real world hidden by the CG image can be seen by the user. In a second embodiment to be described later, the display device is an optical see-through type device, however, the arrangement thereof is the same except that the real world is directly observed through the display device.

Figure 2D:
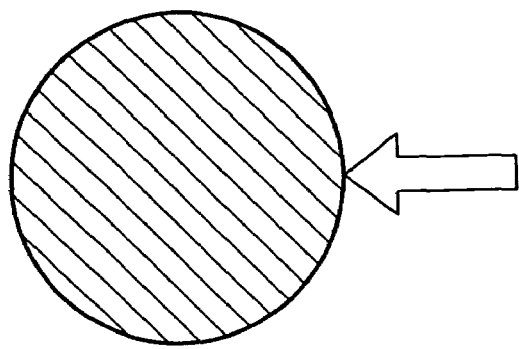
FIGS. 2A to 2D are examples of a CG elimination frame.
Figure 2C:
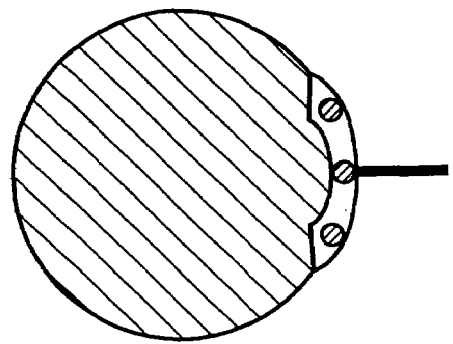
Figure 2B:
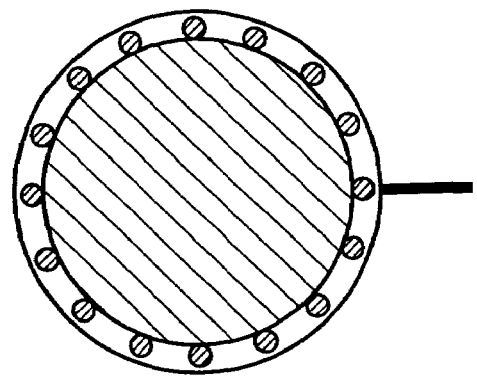
Figure 2A:
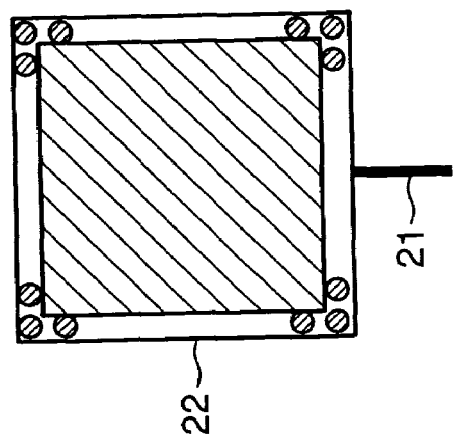

In FIG. 2A, three markers as one set are provided in every four corners of a rectangular frame. The CG elimination area can be calculated only if any one of the four marker sets is extracted. Further, in FIG. 2B, markers are provided surrounding a circular frame. Since a circle can be defined by three points, if arbitrary three markers are extracted, the internal area thereof can be calculated as a CG elimination area. FIG. 2C show a variation that three of the markers in FIG. 2B are used. This arrangement is effective when markers attached to the CG elimination frame as shown in FIG. 2C make the appearance of the flame being troublesome. In FIG. 2D, an area (circle in this figure) ahead of a marker having directionality is defined as a CG elimination area. This arrangement is effective in a case where a marker is not to be placed on the boundary between a CG image drawing portion and a CG elimination area.

The color of the frame can be arbitrarily determined, however, considering that generally a fluorescent color or the like not used in real objects is used for the marker for assistance of detection, a color contrastive to the marker is preferably used for the frame. Further, the size of the frame (the size of CG elimination area) is arbitrarily determined, however, if the frame is too large, the CG elimination area is too large and most of the CG image included in the field of view cannot be displayed; on the other hand, if the frame is too small, the position control of the frame becomes difficult. Accordingly, an arbitrarily frame size is set in consideration of general hand length (in consideration of a variable range since the percentage of the frame in the image changes in correspondence with the distance from the camera to the frame).

Figure 3:
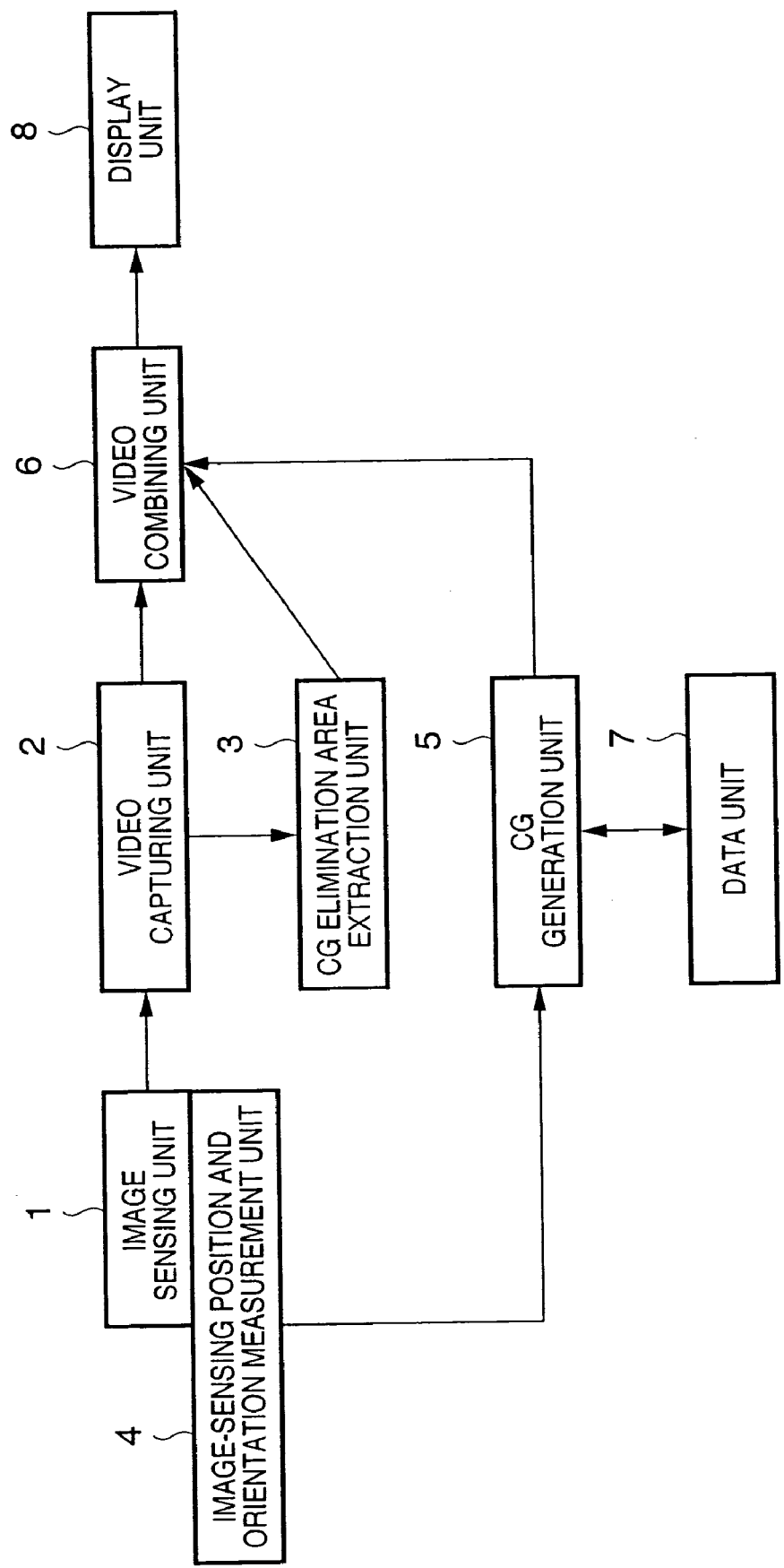
FIG. 3 is a block diagram showing an example of the construction of a video combining apparatus according to a first embodiment of the present invention.

FIG. 3 is a block diagram showing an example of the construction of the video combining apparatus according to the first embodiment of the present invention.

In this embodiment, an image sensing unit 1 is a camera included in the HMD. The image sensing unit 1 obtains video images of real space observed by the user's right eye and left eye, and outputs the obtained video images as video signals to a video capturing unit 2. Note that for the sake of simplification of explanation, processing for the right eye image and processing for left eye image are not separately described. However, it goes without saying that to generate right eye combined image and left eye combined image to be displayed on the HMD, actually, processing for right eye and processing for left eye are performed.

The video capturing unit 2 converts the video signal inputted from the image sensing unit 1 into signal of format suitable for processing in a video combining unit 6 and a CG elimination area extraction unit 3, and outputs the signal to the video combining unit 6 and the CG elimination area extraction unit 3.

The CG elimination area extraction unit 3 extracts the markers provided in the CG elimination frame from the video images inputted from the video capturing unit 2 and extracts a CG elimination area. The area on the video image is the CG elimination area. Then the CG elimination area extraction unit 3 outputs the extracted CG elimination area to the video combining unit 6.

An image-sensing position and orientation measurement unit 4, included in the HMD in this embodiment, transmits position and orientation information of the image sensing unit 1 to a CG generation unit 5 in accordance with or without a request from the CG generation unit 5. As the image-sensing position and orientation measurement unit 4, a geomagnetic sensor, a gyroscopic or an optical sensor or the like may be utilized.

The CG generation unit 5 obtains the position and orientation information of the image sensing unit 1 from the image-sensing position and orientation measurement unit 4, and estimates the position and image sensing direction of the image sensing unit 1. Since the field of view can be obtained from a lens parameter of the image sensing unit 1 if the position and image sensing direction of the image sensing unit 1 are estimated, the CG generation unit 5 reads data included in the field of view of the image sensing unit 1 from a data unit 7, generates a CG image to be superimposed on the video image obtained by the image sensing unit 1, and outputs the CG image to the video combining unit 6.

The video combining unit 6 reads the video image from the video capturing unit 2, the CG image from the CG generation unit 5, and the CG elimination area from the CG elimination area extraction unit 3. Then the video combining unit 6 combines the CG image from the CG generation unit 5 with the video image from the video capturing unit 2. At this time, the CG image is not drawn in a portion overlapped with the CG elimination area obtained by the CG elimination area extraction unit 3. In this manner, a combined video image where only the CG image is eliminated from the CG elimination area is generated.

In a case where the shape (design) of the CG elimination frame is a magnifying glass or the like, the CG elimination frame having the appearance correspond with its function is more preferable as a user interface. Further, it may be arranged such that instead of restraint of CG image drawing in the CG elimination area, a CG image with high transparency (by controlling an a component value indicating transparency) is drawn or a CG image is blinked in correspondence with the type of the CG elimination frame. The CG image generated by the video combining unit 6 is transmitted to the display unit 8 (HMD in the present embodiment).

The data unit 7 of e.g. a hard disk holds data to be delivered to the CG generation unit 5. As data stored in the data unit 7, text information, panorama video images, three-dimensional CG data and the like are stored. In accordance with a request from the CG generation unit 5, the data unit 7 transmits appropriate data to the CG generation unit 5. For example, if a request for three-dimensional CG data to be displayed in the field of view of the image sensing unit 1 is received from the CG generation unit 5, the data unit 7 sends three-dimensional CG data included in the field of view of the image sensing unit 1 to the CG generation unit 5. Note that the data unit 7 is not limited to a hard disk but any storage medium such as a tape or a memory device can be used as long as it can store data.

The display unit 8 which is an HMD in the present embodiment displays the combined video image signal transmitted from the video combining unit 6. Note that in the MR system of the present embodiment, as in the case of the conventionally-known MR system, the HMD has a right-eye image display unit and a left-eye image display unit. The video combining unit 6 generates a display image for right eye and a display image for left eye and supplies them to the HMD, thereby the user can experience three-dimensional CG image display.

Figure 4:
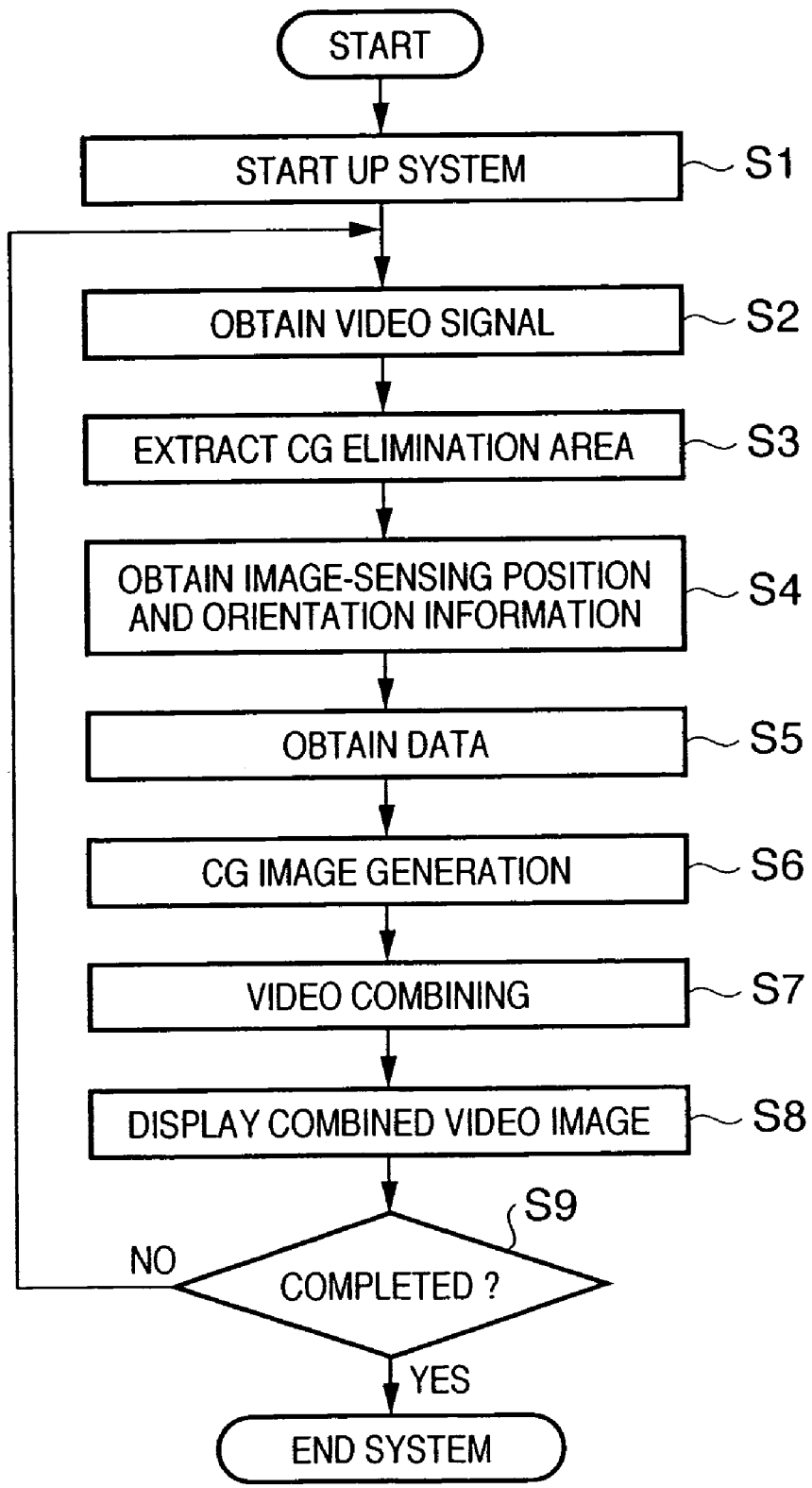
FIG. 4 is a flowchart showing an operation of the video combining apparatus according to the first embodiment.

Next, the operation of the MR system as an example of the video combining apparatus according to the present embodiment having the above construction will be described with reference to the flowchart of FIG. 4. Note that in the following description, the data unit 7 holds necessary data in advance.

First, at step S1, the system is started.

At step S2, a video image is obtained from the image sensing unit 1. The video image is converted to an appropriate format image by the video capturing unit 2, and sent to the video combining unit 6 and the CG elimination area extraction unit 3.

At step S3, the markers are extracted from the video image input in the CG elimination area extraction unit 3, and a CG elimination area is calculated. Then the obtained CG elimination area is sent to the video combining unit 6.

At step S4, the image-sensing position and orientation measurement unit 4 measures the position and orientation of the image sensing unit 1. The measured position and orientation information is sent to the CG generation unit 5.

At step S5, the CG generation unit 5 estimates the field of view of the image sensing unit 1 from the position and orientation information transmitted from the image-sensing position and orientation measurement unit 4, and obtains data in a range included in the field of view of the image sensing unit 1, from the data unit 7.

At step S6, the CG generation unit 5 generates a CG image using the data obtained from the data unit 7, and sends the generated video image to the video combining unit 6.

At step S7, the video combining unit 6 combines the video image transmitted from the video capturing unit 2 with the CG image transmitted from the CG generation unit 5. At this time, the CG image is not combined with the portion of the CG elimination area from the CG elimination area extraction unit 3. Thus a combined video image where the CG image is eliminated from the CG elimination area is generated. The combined video image is sent to the display unit 8.

At step S8, the video image information transmitted from the video combining unit 6 is displayed on the display unit 8.

Thereafter, at step S9, it is checked whether or not the system is ended. If YES, the system is ended at step S10, otherwise, the process returns to step S2 to repeat the above-described processing.

As described above, according to the first embodiment, in an MR system to display, when a user wears the HMD and looks at, e.g., a landscape, position information and names in correspondence with the landscape, even when an object of interest is hidden by CG, the object can be observed by holding the CG elimination frame in a corresponding position.

Second Embodiment

An example of the video combining apparatus according to a second embodiment of the present invention is a medical assistant system to present an image for a doctor as if the inside of the patient's body is visualized. In this system, an optical see-through HMD is used as the display device since the display resolution of video see-through HMD is limited.

Figure 5A:
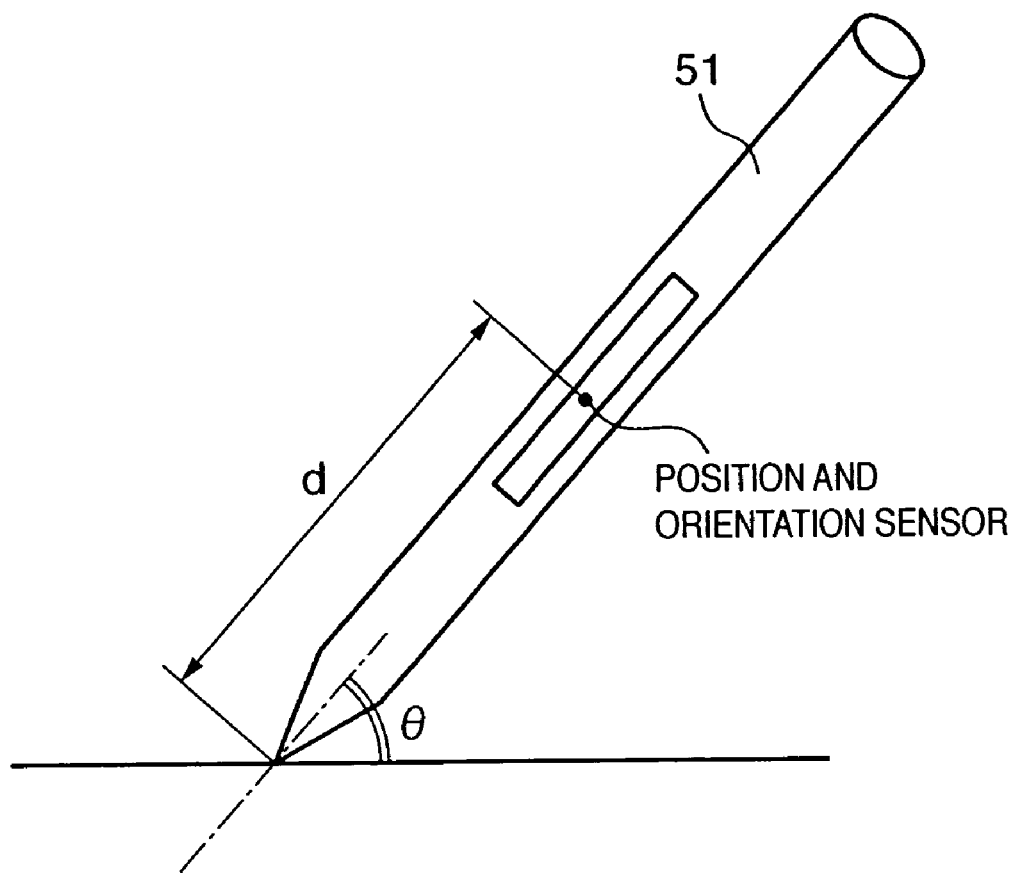
FIGS. 5A and 5B are explanatory views of a stylus used in the video combining apparatus according to a second embodiment of the present invention.
Figure 5B:
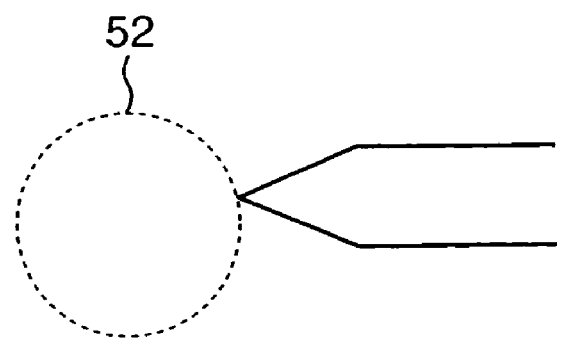

Further, as a user interface to designate the CG elimination area, a stylus is used as a position and orientation information input device. FIGS. 5A and 5B show an example of the stylus. Note that in the following description, it is assumed that a view point position and orientation of the user is fixed. However, a relative relation between the view point position and orientation of the user and those of the stylus is considered practically. A stylus 51 has e.g. a pen shape, and includes a position and orientation sensor. A stylus end position is estimated from a distance d between the position detected by the position and orientation sensor and a distal end of the stylus, and an area designated by the end of the stylus is obtained from the stylus end position and a detected inclination θ of the stylus. In the present embodiment, an area corresponding to a virtual circle 52 in contact with the end of the stylus is defined as a CG elimination designation area. Actually, an elliptic area obtained from the virtual circle 52 in correspondence with the inclination θ of the stylus is a CG elimination area. Note that if the inclination of the stylus (orientation information) cannot be obtained, the virtual circle 52 can be utilized. The position and orientation information of the stylus, and information on an ON-OFF switch (not shown) can be obtained from the outside via a signal line connected to the stylus or a communicator.

In the present embodiment, the position and orientation input device is employed as a user interface because:

(1) in the optical see-through HMD, in which generally a camera is not included, different from the video see-through HMD, to realize designation of CG elimination area by image processing (as in the first embodiment), a camera is newly required, (2) in an operation support system, to enable a doctor to always grasp the status surrounding an affected part of the patient and the positional relation between the affected part and surgical equipments and the like, it is important to measure these positional relations by a sensor or the like and present the information to the doctor in a real-time manner. Accordingly, it is assumed that an environment to perform position and orientation measurement to a certain level of accuracy is provided, and (3) in a case where an operation is performed utilizing an operation support system, although the peripheral portion of an affected part is displayed by the assistance of CG image,
  a case where the doctor wants to display a CG image of a portion very near his/her hands and
  a case where the doctor does not want such CG image display
are conceivable.

In consideration of these cases, the ON-OFF button of the stylus can be allocated to ON-OFF of CG elimination area definition.

Further, in a case where a surgical equipment is provided with a position and orientation sensor, CG image display method can be easily selected by simply selecting the "surgical tool with sensor" or a "surgical tool without sensor".

FIG. 6 is a block diagram showing an example of the construction of the MR system according to the second embodiment.

A head position and orientation measurement unit 14, included in the HMD as the display unit 18 to be described later, transmits head position and orientation information of a user to the CG elimination area extraction unit 13 and the CG generation unit 15 in accordance with or without a request from the CG elimination area extraction unit 13 and the CG generation unit 15. As the head position and orientation measurement unit 14, a geomagnetic sensor, a gyroscopic or optical sensor or the like may be utilized.

A stylus state detection unit 19 obtains stylus information (position, orientation, button ON/OFF state and the like) from a stylus 20, and in accordance with or without a request from the CG elimination area extraction unit 13, transmits the information to the CG elimination area extraction unit 13.

The CG elimination area extraction unit 13 calculates a CG elimination area from the position and orientation data inputted from the head position and orientation measurement unit 14 and the stylus information inputted from the stylus state detection unit 19. As described above, in the present embodiment, an end position of the stylus on an image plane and the orientation of the stylus to the image plane can be calculated from the position and orientation of the head and the position and orientation of the stylus. An elliptic area (ellipticity is determined from the information on the orientation of the stylus to the image plane) spread on the image plane from the end of the stylus is defined as a CG elimination area. The CG elimination area extraction unit 13 outputs the extracted CG elimination area to a video combining unit 16.

The CG generation unit 15 inputs the head position and orientation information from the head position and orientation measurement unit 14 and estimates the position and direction of the head. As the field of view of the user can be obtained if the position and orientation are estimated, the CG generation unit 15 inputs data corresponding to a portion included in the field of view of the user from a data unit 17, generates a CG image overlapped with the field of view of the user, and outputs it to the video combining unit 16.

The video combining unit 16 reads the CG image from the CG generation unit 15 and the CG elimination area from the CG elimination area extraction unit 13. Then the video combining unit 16 processes the CG image based on the CG elimination area data from the CG elimination area extraction unit 13, and transmits the CG image to the display unit 18.

The data unit 17 of e.g. a hard disk holds data to be delivered to the CG generation unit 15. As data stored in the data unit 17, text information, panorama video images, three-dimensional CG data and the like are stored. In accordance with a request from the CG generation unit 15, the data unit 17 transmits appropriate data to the CG generation unit 15. For example, if a request for three-dimensional CG data to be displayed in the field of view of the user is received from the CG generation unit 15, the data unit 17 sends three-dimensional CG data included in the field of view of the user to the CG generation unit 15. Note that the data unit 17 is not limited to a hard disk but any storage medium such as a tape or a memory can be used as long as it can store data.

The display unit 18 here is an optical see-through HMD. The display unit 18 displays the video image signal transmitted from the video combining unit 16 so that the video image overlaps on the real world seen through a half mirror by, e.g., projecting the video image signal on the half mirror.

Figure 7:
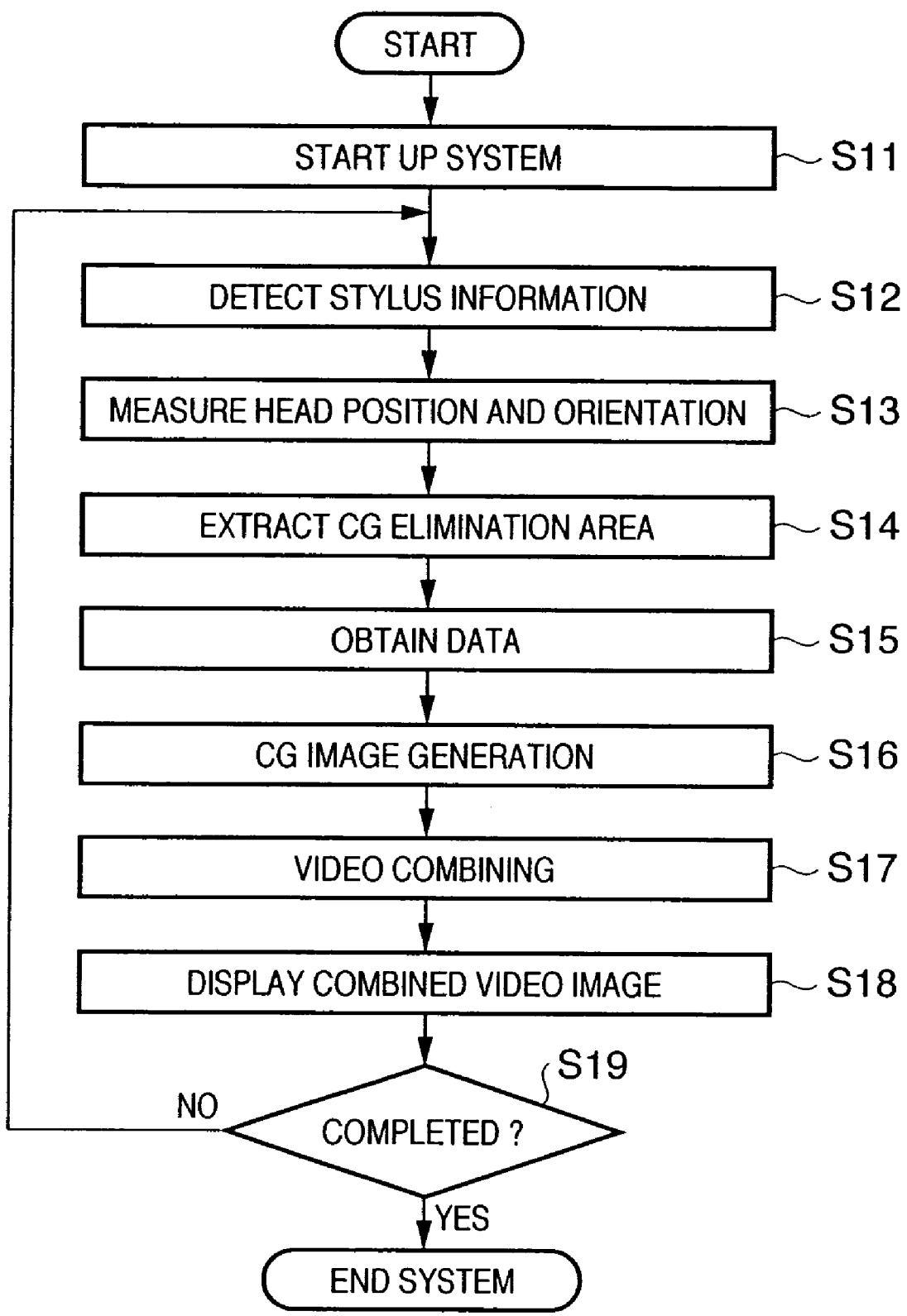
FIG. 7 is a flowchart showing the operation of the video combining apparatus according to the second embodiment.

Next, the operation of the MR system as an example of the video combining apparatus according to the second embodiment having the above construction will be described with reference to the flowchart of FIG. 7. Note that in the following description, the data unit 17 holds necessary data in advance.

First, at step S11, the system is started.

At step S12, the stylus state detection unit 19 detects the state of the stylus. The detected information is sent to the CG elimination area extraction unit 13.

At step S13, the head position and orientation measurement unit 14 measures the position and orientation of the user. The measured position and orientation information is sent to the CG elimination area extraction unit 13 and the CG generation unit 15.

At step S14, The CG generation area extraction unit 13 calculates a CG elimination area based on the stylus position and orientation information inputted from the stylus state detection unit 19 and the head position and orientation information inputted from the head position and orientation measurement unit 14. The CG elimination area is sent to the video combining unit 16.

At step S15, the CG generation unit 15 estimates the field of view of the user from the head position and orientation information transmitted from the head position and orientation measurement unit 14, and obtains data in a range included in the field of view of the user, from the data unit 17.

At step S16, the CG generation unit 15 generates a CG image using the data obtained from the data unit 17, and sends the generated video image to the video combining unit 16.

At step S17, the video combining unit 16 processes the CG image transmitted from the CG generation unit 15 based on the CG elimination area data from the CG elimination area extraction unit 13 (the CG image is not drawn in a portion of the CG elimination area transmitted from the CG elimination area extraction unit 13). The video image is sent to the display unit 18.

At step S18, the video image information transmitted from the video combining unit 16 is displayed on the display unit 18 as an optical see-through HMD, thereby the user recognizes the CG image superimposed in real space.

Thereafter, at step S19, it is checked whether or not the system is ended. If YES, the system is ended, otherwise, the process returns to step S12 to repeat the above-described processing.

As described above, according to the second embodiment, in a case where an operation is performed utilizing an operation support system, CG image display very near the hands or CG image display not made very near the hands can be easily selected.

Third Embodiment

In the video combining apparatus according to the first embodiment, the frame as shown in FIGS. 2A to 2D is employed for designation of CG elimination area.

The feature of the present embodiment is that a CG elimination area can be designated with not the frame but a user's hands in the video combining apparatus according to the first embodiment.

Figure 9B:
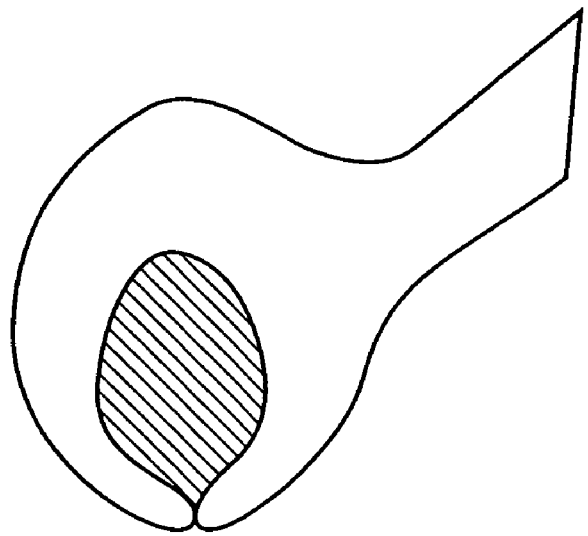
FIGS. 9A and 9B are explanatory views showing the method of designation of CG elimination area, by a user's hand(s), in the video combining apparatus according to the third embodiment.
Figure 9A:
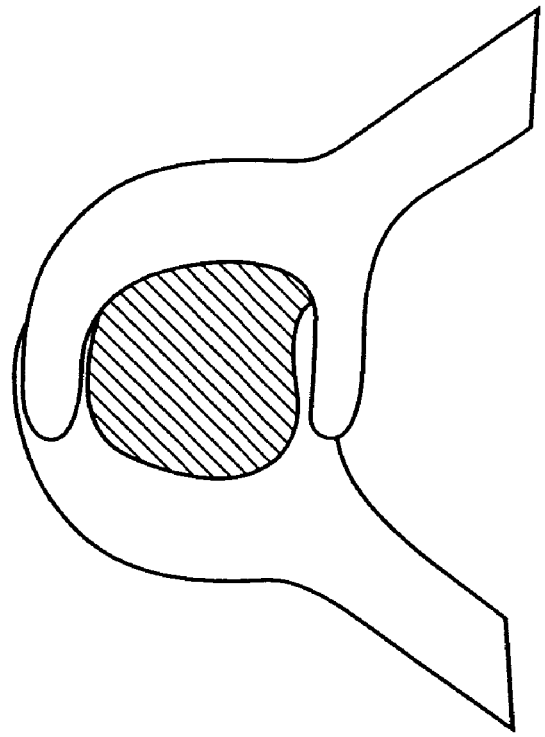

More particularly, an area surrounded with the user's hands (hatched area) as shown in FIGS. 9A and 9B is recognized as a CG elimination area. That is, the user forms an eye hole with his/her hand(s) thereby designates a desired area as a CG elimination area. FIG. 9A shows an example of designation of CG elimination area with both hands, and FIG. 9B, an example of designation of CG elimination area with a single hand. In this manner, the CG elimination area can be designated with hand(s) and the frame is not necessary. Further, the designation of CG elimination area can be made by the user's natural action.

Figure 8:
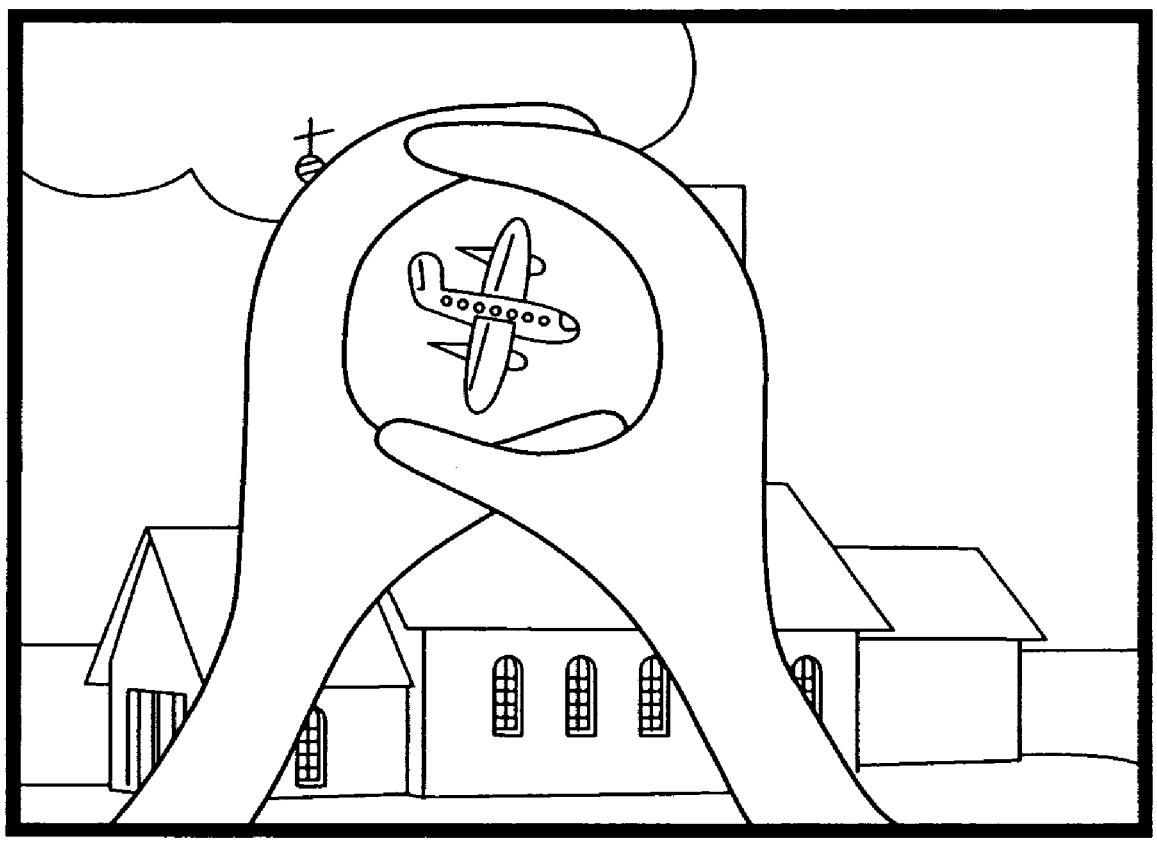
FIG. 8 is an explanatory view showing a method of designation of CG elimination area in the video combining apparatus according to a third embodiment of the present invention.

When the user observes a superimposed image as shown in FIG. 1A, if the user wants to delete an image superimposed on e.g. the balloon "church", the user forms an eye hole in a desired position (area where the CG image is not to be displayed) (See FIG. 8).

The video combining apparatus of the present embodiment has a construction to extract the area of the user's hand(s) from a video image from the user's view point position such that the hand(s) is always visible, and perform mask processing of not drawing a CG image in the area (visualizing an object which is hidden by the CG image in the user's sight). This construction to perform the mask processing is realized by using e.g. a chroma key technique proposed in Japanese Published Unexamined Patent Application No. 2002-95535.

Generally, as the mask processing on the hand includes a process of extraction of the area of the user's hand(s), the internal area of the hand(s) can be easily extracted from a video image from the user's view point.

That is, the video combining apparatus of the present embodiment can be realized only by adding processing of extracting the internal area of the hand(s) (the hatched area in FIGS. 9A and 9B) in the video image from the user's view point to the MR system capable of hand mask processing.

As described later, the area of the user's hand(s) is extracted from the video image from the user's view point position, and further, the hand internal area (eye hole area) is extracted, thereby a designated area is obtained.

The extraction of the user's hand area in the video image from the user's view point and the restraint of drawing in the hand internal area solve the problem that the hand(s) positioned in the user's sight is hidden by the CG image, and further, enable clear visualization of a predetermined area in real space without obstruction of a CG image. Thus, in the present embodiment, processing is simplified by handling the hand area and the hand internal area as a CG elimination area.

It may be arranged such that the hand area is handled separately from the CG elimination area (the hand internal area). In this case, a flesh color portion is extracted as a hand area, and its internal area is detected as a CG elimination area. At this time, for the purpose of easy extraction of hand area, it may be arranged such that the user wears a blue glove, then a blue area is extracted as a hand area and a flesh color CG image is combined with the hand area, and a CG image is not displayed in the CG elimination area.

Figure 10:
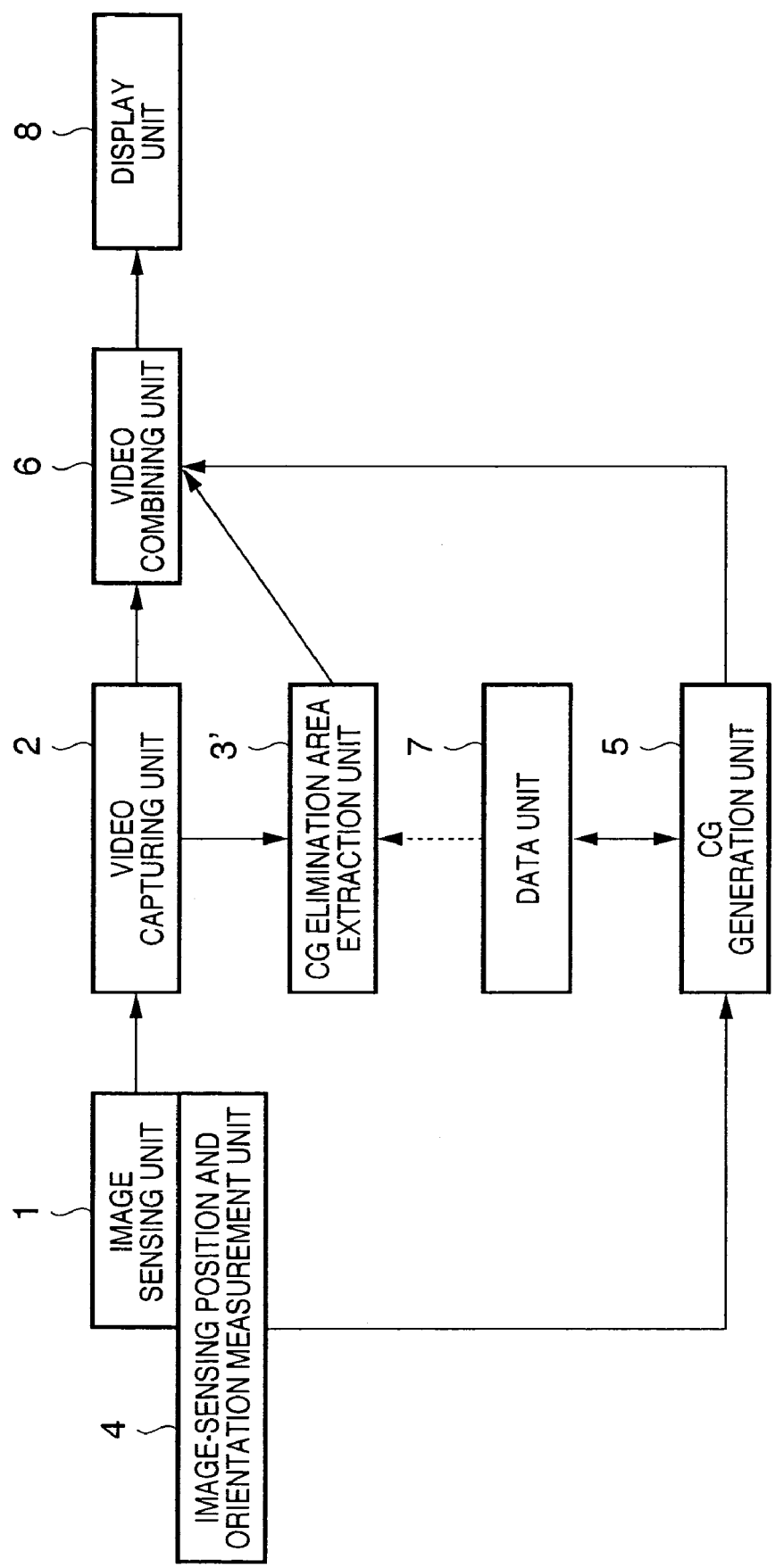
FIG. 10 is a block diagram showing an example of the construction of the video combining apparatus according to the third embodiment.

FIG. 10 is a block diagram showing the construction of an MR system as an example of the video combining apparatus according to the third embodiment. In FIG. 10, constituent elements corresponding to those in FIG. 3 have the same reference numerals and explanations thereof will be omitted.

That is, the CG elimination area extraction unit 3' extracts a hand area and an area surrounded with the hand area (hand internal area) from a video image inputted from the video capturing unit 2 and data on hand area extraction from the data unit 7 (for example, data defining the above-described particular color), if necessary. The CG elimination area extraction unit 3' extracts at least the hand internal area as a CG elimination area, and outputs the extracted CG elimination area to the video combining unit 6.

The image-sensing position and orientation measurement unit 4 is included in the HMD. In accordance with or without a request from the CG generation unit 5, the image-sensing position and orientation measurement unit 4 transmits the position and orientation information of the image sensing unit 1 to the CG generation unit 5. As the image-sensing position and orientation measurement unit 4, a geomagnetic sensor, a gyroscopic or optical sensor or the like may be utilized.

The CG generation unit 5 obtains the position and orientation information of the image sensing unit 1 from the image-sensing position and orientation measurement unit 4, and estimates the position and image sensing direction of the image sensing unit 1. As the field of view can be obtained from a lens parameter of the image sensing unit 1 if the position and image sensing direction of the image sensing unit 1 are estimated, the CG generation unit 5 reads data included in the field of view of the image sensing unit 1 from a data unit 7, generates a CG image to be combined with the video image obtained by the image sensing unit 1, and outputs the CG image to the video combining unit 6.

The video combining unit 6 reads the video image from the video capturing unit 2, the CG image from the CG generation unit 5, and the CG elimination area from the CG elimination area extraction unit 3. Then the video combining unit 6 combines the CG image from the CG generation unit 5 with the video image from the video capturing unit 2. At this time, the CG image is not drawn in a portion overlapped with the CG elimination area obtained by the CG elimination area extraction unit 3. In this manner, a combined video image where only the CG image is eliminated from the CG elimination area is generated.

Further, it may be arranged such that in stead of restraint of drawing the CG image in the CG elimination area, but a CG image with high transparency (by controlling an a component value indicating transparency) is drawn or a CG image is flash-drawn in correspondence with the type of the CG elimination frame. The CG image generated by the video combining unit 6 is transmitted to the display unit 8 (HMD in the present embodiment).

The data unit 7 of e.g. a hard disk holds data to be delivered to the CG generation unit 5 and the CG elimination area extraction unit 3'. As data stored in the data unit 7, text information, panorama video images, three-dimensional CG data, further, data necessary for extraction of particular area such as a hand area or a hand internal area (data defining a particular color or the like), and the like, are stored.

In accordance with a request from the CG generation unit 5, the data unit 7 transmits appropriate data to the CG generation unit 5. For example, if a request for three-dimensional CG data to be combined in the field of view of the image sensing unit 1 is received from the CG generation unit 5, the data unit 7 sends three-dimensional CG data included in the field of view of the image sensing unit 1 to the CG generation unit 5.

Further, in accordance with a request from the CG elimination area extraction unit 3', the data unit 7 transmits appropriate data to the CG elimination area extraction unit 3'.

The display unit 8 which is an HMD in the present embodiment displays the combined video image signal transmitted from the video combining unit 6. Note that in the MR system of the present embodiment, as in the case of the conventionally-known MR system, the HMD has a right-eye image display unit and a left-eye image display unit. The video combining unit 6 generates a display image for right eye and a display image for left eye and supplies them to the HMD, thereby the user can experience three-dimensional CG image display.

Figure 11:
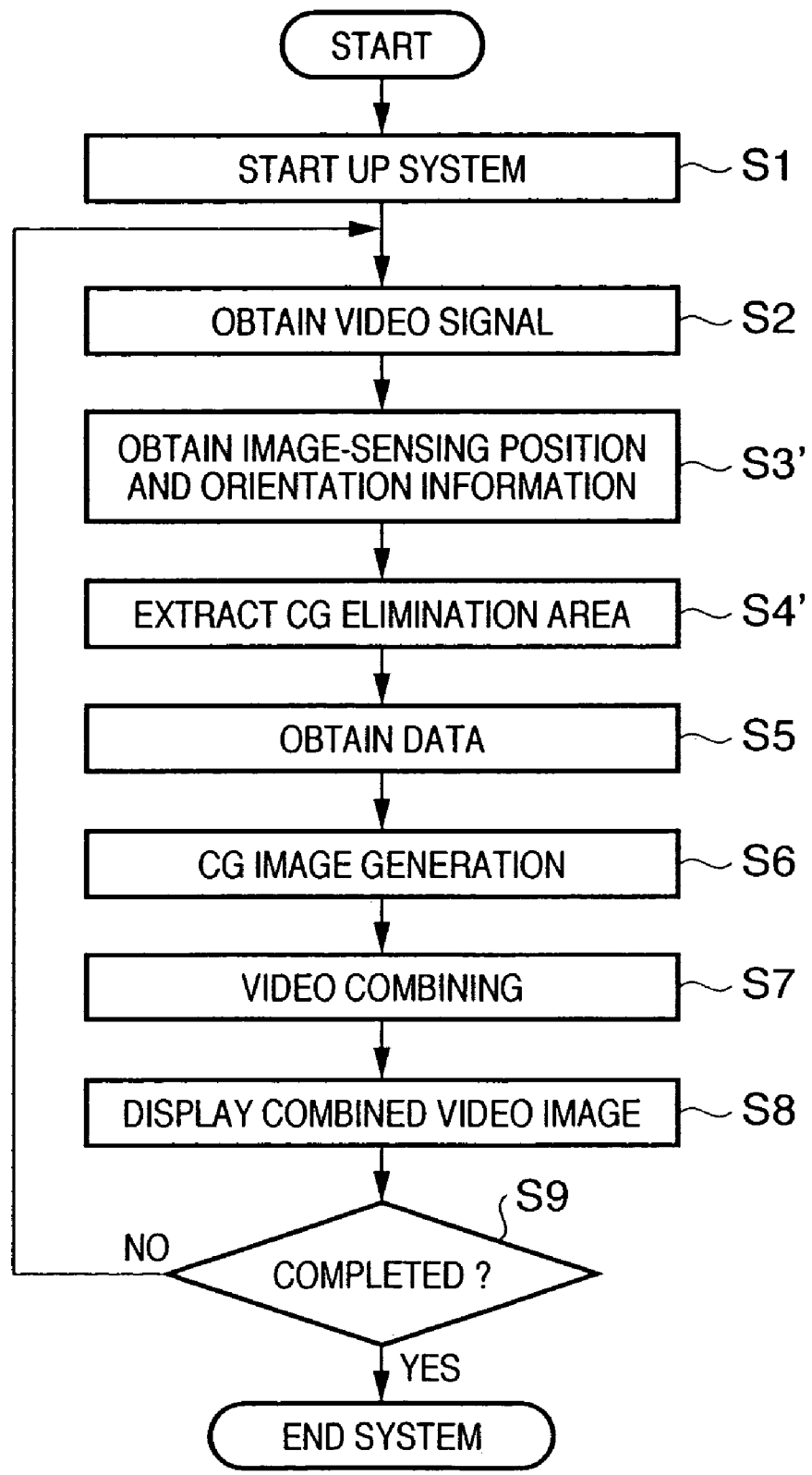
FIG. 11 is a flowchart showing the operation of the video combining apparatus according to the third embodiment.

Next, the operation of the MR system as an example of the video combining apparatus according to the third embodiment having the above construction will be described with reference to the flowchart of FIG. 11. As it is apparent from a comparison between the flowcharts of FIGS. 11 and 4, the operation of the video combining apparatus of the present embodiment is the same as that in the first embodiment except that the order of the step of acquisition of image-sensing position and orientation information and the step of extraction of CG elimination area is inverted and that the content of the CG elimination area extraction processing is different. Note that in the following description, the data unit 7 holds necessary data in advance.

First, at step S1, the system is started.

At step S2, a video image is obtained from the image sensing unit 1. The video image is converted to an appropriate format image by the video capturing unit 2, and sent to the video combining unit 6 and the CG elimination area extraction unit 3.

At step S3', the image-sensing position and orientation measurement unit 4 measures the position and orientation of the image sensing unit 1. The measured position and orientation information is sent to the CG generation unit 5.

At step S4', a CG elimination area is calculated from the video image inputted into the CG elimination area extraction unit 3'.

Figure 12:
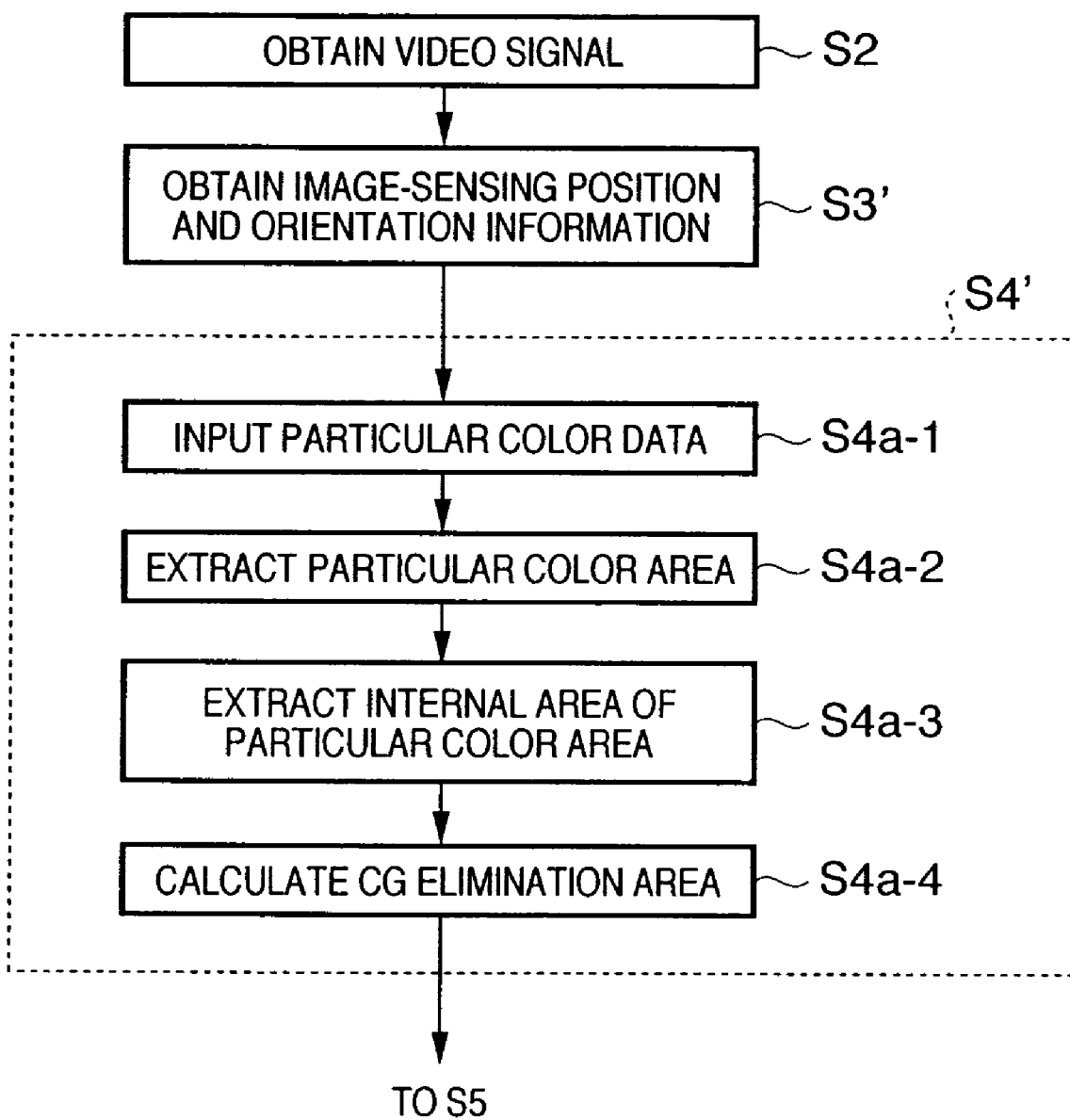
FIG. 12 is a flowchart showing the operation of CG elimination area extraction according to the third embodiment.

Next, the details of step S4' which is a characteristic step of the present embodiment will be described with reference to the flowchart of FIG. 12.

First, an example of step S4' will be described about a case where a hand area is extracted by using image processing to extract a particular color.

At step S4a-1, the CG elimination area extraction unit 3' reads data on a hand area, if necessary, from the data unit 7. As the data on a hand area, information on flesh color of the hand or the like is used. Generally, the data on hand area is read at once, however, in a case where the position of a light source changing in a real time manner is measured and flesh color data is required in correspondence with the changing light source position, the step is necessary.

At step S4a-2, a hand area is extracted from the video image input in the CG elimination area extraction unit 3' from the data on the hand area.

At step S4a-3, an internal area of the hand area on the video image is extracted.

AT step S4a-4, the hand area and the internal area of the hand area on the video image are extracted as a CG elimination area.

It may be arranged such that step S4 is implemented using any other hand area extraction method in hand mask processing than the above processing.

The calculated CG elimination area is sent to the video combining unit 6.

At step S5, the CG generation unit 5 estimates the field of view of the image sensing unit 1 from the position and orientation information transmitted from the image-sensing position and orientation measurement unit 4, and obtains data in a range included in the field of view of the image sensing unit 1, from the data unit 7.

At step S6, the CG generation unit 5 generates a CG image using the data obtained from the data unit 7, and sends the generated video image to the video combining unit 6.

At step S7, the video combining unit 6 combines the video image transmitted from the video capturing unit 2 with the CG image transmitted from the CG generation unit 5. At this time, the CG image is not combined with the portion of the CG elimination area from the CG elimination area extraction unit 3. Thus a combined video image where the CG image is eliminated from the CG elimination area is generated. The combined video image is sent to the display unit 8.

At step S8, the video image information transmitted from the video combining unit 6 is displayed on the display unit 8.

Thereafter, at step S9, it is checked whether or not the system is ended. If YES, the system is ended at step S10, otherwise, the process returns to step S2 to repeat the above-described processing.

As described above, according to the third embodiment, in an MR system to display, when a user wears the HMD and looks at e.g. a landscape, position information and names in correspondence with the landscape, even if an object of interest is hidden by a CG image, the object can be observed by forming an eye hole with the user's hand(s) in a corresponding position.

Fourth Embodiment

In the above-described first and second embodiments, the HMD is employed as a display unit, however, the present invention is applicable to a head up display (HUD) optical see-through AR system as disclosed in Japanese Published Unexamined Patent Application No. 10-051711, in which a superimposed image is generated in correspondence with a display device and a view point position.

Other Embodiment

Further, in the second embodiment, the optical see-through HMD is employed, however, the second embodiment is applicable to a system using a video see-through HMD as described in the first embodiment.

Further, in the third embodiment, a CG elimination area is designated utilizing mask processing without any tool such as a frame, however, mask processing can be utilized even in designation of CG elimination area using a frame as shown in FIGS. 2A to 2D or the like. In such case, a frame having a shape as shown in FIGS. 2A to 2D, has a particular color, and a CG elimination area is defined as "internal area of the particular color", thereby similar CG elimination processing to that of the third embodiment can be performed.

In this case, the frame is not necessarily provided with markers. Further, the particular color of the frame is not limited to a flesh color but may be blue, red or any color, however, it is preferable that the color is not included in a background color.

Further, in the third embodiment, a hand area is extracted by utilizing mask processing, however, the hand area may be extracted by other processing than the mask processing. For example, it may be arranged such that the user wears a glove provided with plural position sensors, and the hand area is extracted from outputs from the sensors.

Figure 13:
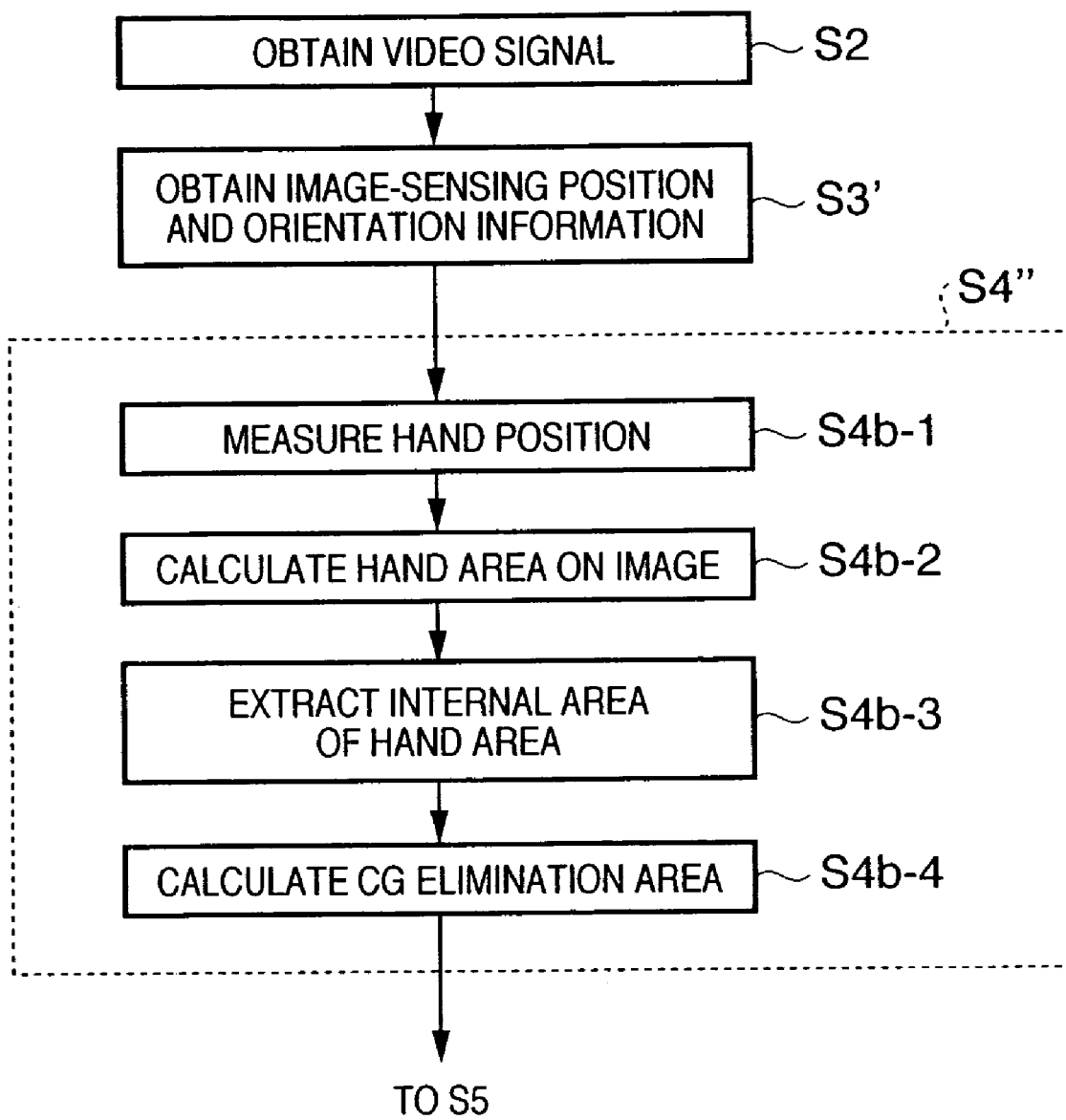
FIG. 13 is a flowchart showing the operation of CG elimination area extraction according to the third embodiment.

Next, the processing at CG elimination area extraction step S4' to extract a hand area by the above method will be described with reference to the flowchart of FIG. 13.

At step S4b-1, the position of the hand is measured.

At step S4b-2, a hand area on a video image from the view point position of the user is calculated from the measured hand position information and view-point position information of the user.

At step S4b-3, an internal area of the hand area on the video image from the view point position of the user is extracted.

At step S4b-4, a CG elimination area is calculated from the hand area and the internal area of the hand area on the video image from the view point position of the user.

Thereafter, the processing at step S5 and the subsequent steps is performed.

Note that in addition to the above-described embodiments, the present invention includes a case where a software program to realize the functions of the above-described embodiments is supplied directly from a recording medium or via cable/radio communication to a system or apparatus having a computer capable of execution of the program, and the computer of the system or apparatus executes the supplied program thereby achieves equivalent functions.

Accordingly, to realize the functional processing of the present invention, the program code itself supplied and installed into the computer realizes the present invention. That is, the computer program itself to realize the functional processing of the present invention is included in the present invention.

In this case, the program having any form such as object code, an interpreter-executable program and script data supplied to an OS, can be employed as long as it has a program function.

Further, the storage medium, such as a flexible disk, a hard disk, a magnetic recording medium such as a magnetic tape, an optical/magneto-optical storage medium such as an MO, a CD-ROM, a CD-R, a CD-RW, a DVD-ROM, a DVD-R and a DVD-RW, a nonvolatile semiconductor memory, and the like, can be used for providing the program code.

As a method for supplying the program by cable/radio communication, a data file (program data file) of a computer program itself or a compressed file having automatic installation function, which can be a computer program forming the present invention on a client computer, is stored on a server on a computer network, and the program data file is downloaded to a connected client computer. In this case, the program data file may be divided into plural segment files and stored on different servers.

That is, the server apparatus for downloading the program data file to realize the functional processing of the present invention to plural users is included in the present invention.

Further, the program of the present invention may be encrypted and stored on a storage medium such as a CD-ROM delivered to users, such that a user who satisfied a predetermined condition is allowed to download key information to decryption from a homepage via e.g. the Internet, then the program is decrypted with the key information and installed into a computer, thereby the present invention is realized.

Further, besides the above-described functions of the above embodiments are realized by executing the read program by a computer, the present invention includes a case where an OS or the like working on the computer performs a part or entire actual processing in accordance with designations of the program code and realizes the functions of the above embodiments.

Further, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes the functions of the above embodiments.

According to the present invention, in an MR system to superimpose a CG image on real space, if a real space portion to be observed is hidden by the CG image, an area where the CG image is not to be displayed is simply designated and the CG image in the area is partially not displayed (deleted), thereby real space of interest can be observed.

As many apparently widely different embodiments of the present invention can be made without departing from the spirit and scope thereof, it is to be understood that the invention is not limited to the specific embodiments thereof except as defined in the appended claims.

What is claimed is:

1. A video combining method for superimposing a computer graphics image generated by a computer on a real world observed by a user, said method comprising the steps of:
   a first extracting step of extracting a region having a particular color from the real world observed by the user;
   a second extracting step of extracting a closed region within the region extracted by the first extracting step;
   an inputting step of inputting position and orientation information of a view point of the user;
   a generating step of generating a computer graphics image based on the position and orientation information;
   a determining step of determining an image elimination region over which the computer graphics image is not to be superimposed, based on (a) the closed region and (b) the position and orientation information; and
   a superimposing step of superimposing the computer graphics image on the real world observed by the user except for the image elimination region.

2. The video combining method according to claim 1, wherein the first extracting step extracts as the region having the particular color a region corresponding to at least one hand of the user.

3. A video combining apparatus for superimposing a computer graphics image generated by a computer on a real world observed by a user, said apparatus comprising:
   first extracting means for extracting a region having a particular color from the real world observed by the user;
   second extracting means for extracting a closed region within the region extracted by the first extracting means;
   inputting means for inputting position and orientation information of a view point of the user;
   generating means for generating a computer graphics image based on the position and orientation information;
   determining means for determining an image elimination region over which the computer graphics image is not to be superimposed, based on (a) the closed region and (b) the position and orientation information; and
   superimposing means for superimposing the computer graphics image on the real world observed by the user except for the image elimination region.

4. The video combining apparatus according to claim 3, wherein the first extracting means extracts as the region having the particular color a region corresponding to at least one hand of the user.

5. A computer-readable storage medium storing a program for causing a computer to effect the method of claim 1.

6. A video combining method for superimposing a computer graphics image generated by a computer on a video image of a real world observed by a user, said method comprising the steps of:
   a first extracting step of extracting a region having a particular color from the video image of the real world observed by the user;
   a second extracting step of extracting a closed region within the region extracted by the first extracting step;
   an inputting step of inputting position and orientation information of a view point of the user;
   a generating step of generating a computer graphics image based on the position and orientation information;
   a determining step of determining an image elimination region over which the computer graphics image is not to be superimposed, based on (a) the closed region and (b) the position and orientation information; and
   a superimposing step of superimposing the computer graphics image on the video image of the real world observed by the user except for the image elimination region.

7. The video combining method according to claim 6, wherein the first extracting step extracts as the region having the particular color a region corresponding to at least one hand of the user.

8. A video combining apparatus for superimposing a computer graphics image generated by a computer on a video image of a real world observed by a user, said apparatus comprising:
   first extracting means for extracting a region having a particular color from the video image of the real world observed by the user;
   second extracting means for extracting a closed region within the region extracted by the first extracting means;
   inputting means for inputting position and orientation information of a view point of the user;
   generating means for generating a computer graphics image based on the position and orientation information;
   determining means for determining an image elimination region over which the computer graphics image is not to be superimposed, based on (a) the closed region and (b) the position and orientation information; and
   superimposing means for superimposing the computer graphics image on the video image of the real world observed by the user except for the image elimination region.

9. The video combining apparatus according to claim 8, wherein the first extracting means extracts as the region having the particular color a region corresponding to at least one hand of the user.

10. A computer-readable storage medium storing a program for causing a computer to effect the method of claim 6.

* * * * *